US007479987B2

(12) United States Patent
Watanabe et al.

(10) Patent No.: US 7,479,987 B2
(45) Date of Patent: Jan. 20, 2009

(54) IMAGE PROVIDING SERVICE SYSTEM

(75) Inventors: Jun-ichiro Watanabe, Tokyo (JP);
Sergio Paolantonio, Kokubunji (JP);
Takeshi Hoshino, Kodaira (JP); Peter Hohmann, Garbagniate Milanese (IT)

(73) Assignee: Hitachi, Ltd., Tokyo (JP)

( * ) Notice: Subject to any disclaimer, the term of this patent is extended or adjusted under 35 U.S.C. 154(b) by 702 days.

(21) Appl. No.: 11/072,307

(22) Filed: Mar. 7, 2005

(65) Prior Publication Data
US 2006/0132605 A1 Jun. 22, 2006

(30) Foreign Application Priority Data
Dec. 17, 2004 (JP) ............... 2004-365260

(51) Int. Cl.
*H04N 5/232* (2006.01)
(52) U.S. Cl. .............. 348/211.3; 348/211.2; 348/211.8; 348/207.1; 348/207.99; 396/57
(58) Field of Classification Search ............. 348/211.3, 348/14.08, 14.09
See application file for complete search history.

(56) References Cited

U.S. PATENT DOCUMENTS

| | | | | |
|---|---|---|---|---|
| 5,495,576 A * | 2/1996 | Ritchey | ............ | 345/420 |
| 6,583,808 B2 * | 6/2003 | Boulanger et al. | ....... | 348/14.09 |
| 7,265,779 B2 * | 9/2007 | Sato et al. | ............ | 348/207.1 |
| 2002/0049728 A1 | 4/2002 | Kaku | | |
| 2002/0135677 A1 * | 9/2002 | Noro et al. | ........... | 348/143 |
| 2003/0007785 A1 * | 1/2003 | Shimizu | ............ | 386/117 |
| 2003/0189649 A1 * | 10/2003 | Kuno | ............ | 348/211.1 |
| 2004/0059499 A1 | 3/2004 | Rudd et al. | | |
| 2005/0088533 A1 * | 4/2005 | Wang et al. | ........... | 348/211.99 |
| 2005/0117033 A1 * | 6/2005 | Matsui | ............ | 348/239 |
| 2005/0151850 A1 * | 7/2005 | Ahn et al. | ........... | 348/207.99 |
| 2006/0072757 A1 * | 4/2006 | Renkis | ............ | 380/270 |
| 2006/0125930 A1 * | 6/2006 | Mindrum et al. | ....... | 348/211.3 |

FOREIGN PATENT DOCUMENTS

| | | |
|---|---|---|
| JP | 11-215421 | 8/1999 |
| JP | 2002-185837 | 6/2002 |
| JP | 2002-218426 | 8/2002 |

\* cited by examiner

*Primary Examiner*—Tuan Ho
*Assistant Examiner*—Quang V Le
(74) *Attorney, Agent, or Firm*—Antonelli, Terry, Stout & Kraus, LLP.

(57) ABSTRACT

To take a ceremonial photograph including a user himself/herself in a theme park or the like, the user must hand to a third person a camera to ask the photographing. There is a system which can take a picture of a user when the user is in a predetermined position, but the user cannot confirm the picture when the user is being photographed. For the purposes, an image service system includes plural cameras connected to a network, an administration server for accumulating or distributing images taken by the cameras, and a client terminal for displaying the images taken by the cameras. The position of the user and the positions of surrounding cameras located within a predetermined distance from the client terminal are detected automatically. Images including the user can be displayed on the terminal.

22 Claims, 19 Drawing Sheets

- 401 — NAME :
- 402 — ADDRESS :
- 403 — PHONE NUMBER :
- 404 — MAIL ADDRESS :
- 405 — PHOTOGRAPHED MODE :  ON / OFF

- 501 — NAME :
- 502 — MAIL ADDRESS (ID NUMBER) :

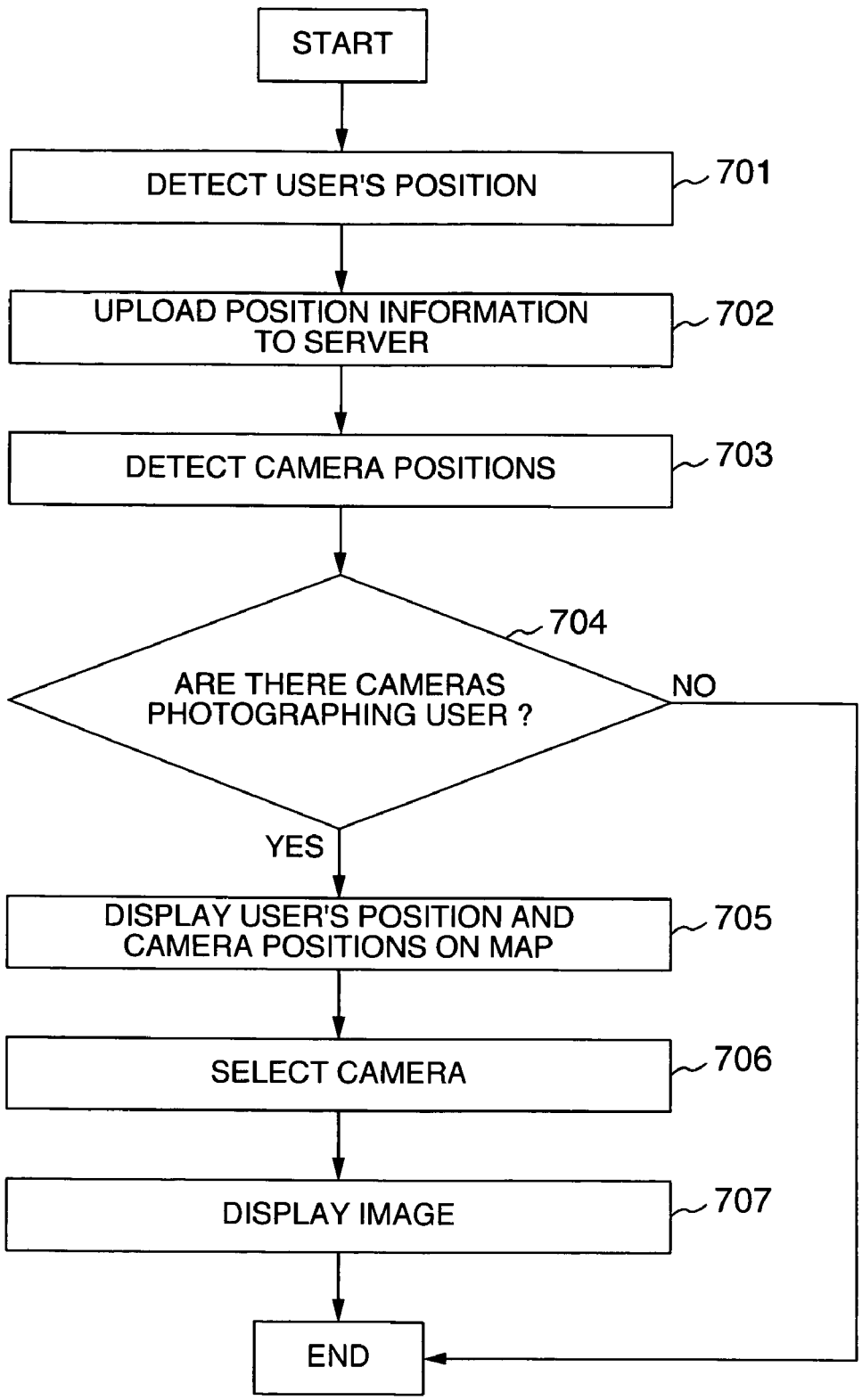

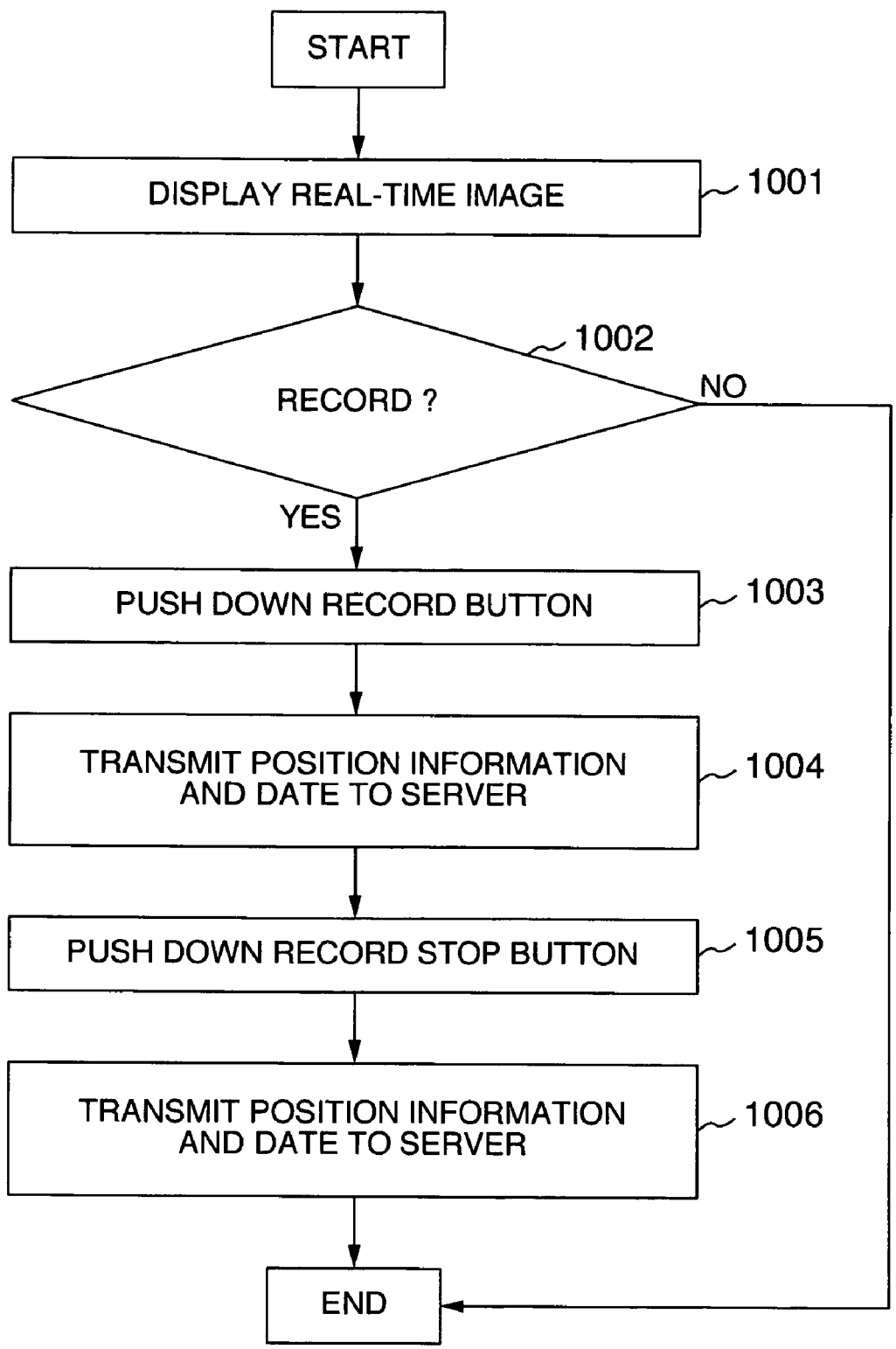

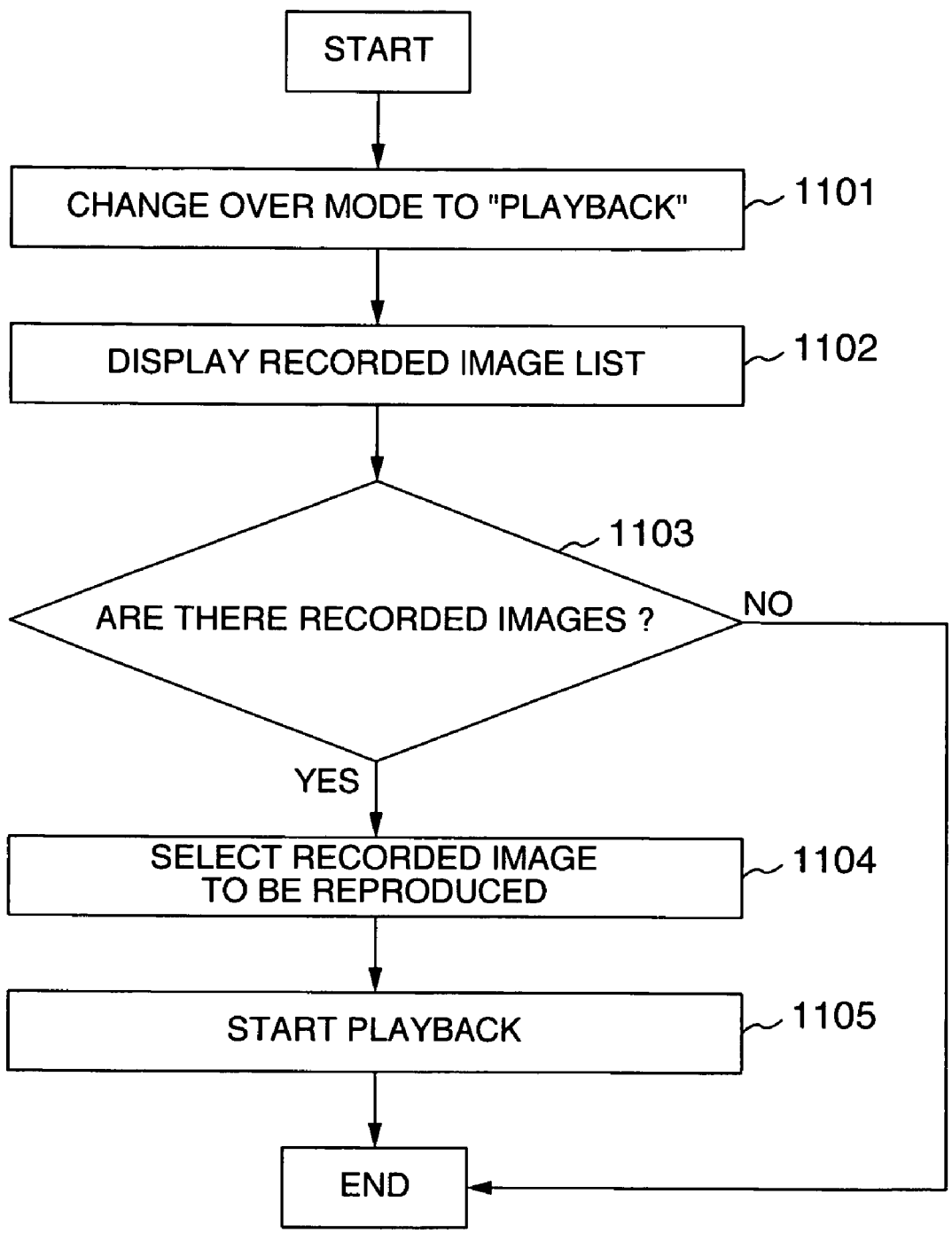

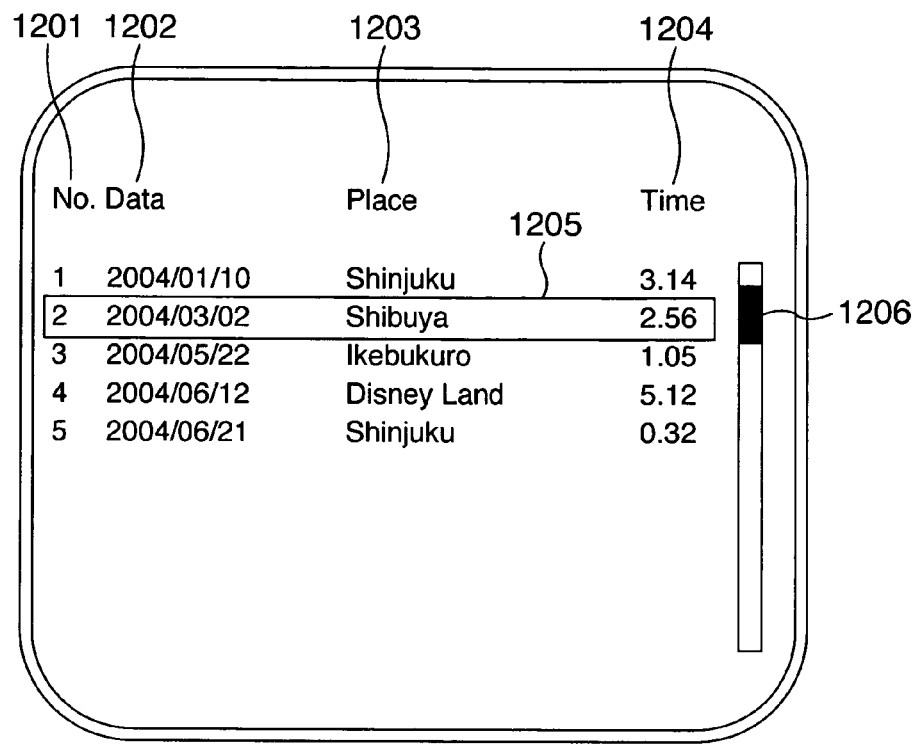
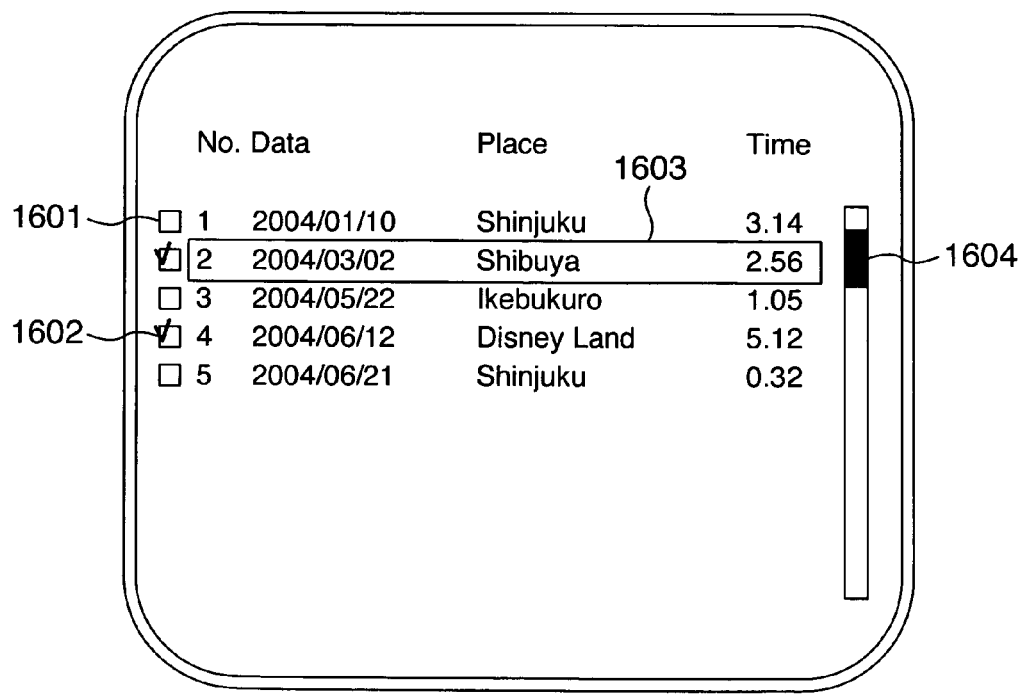

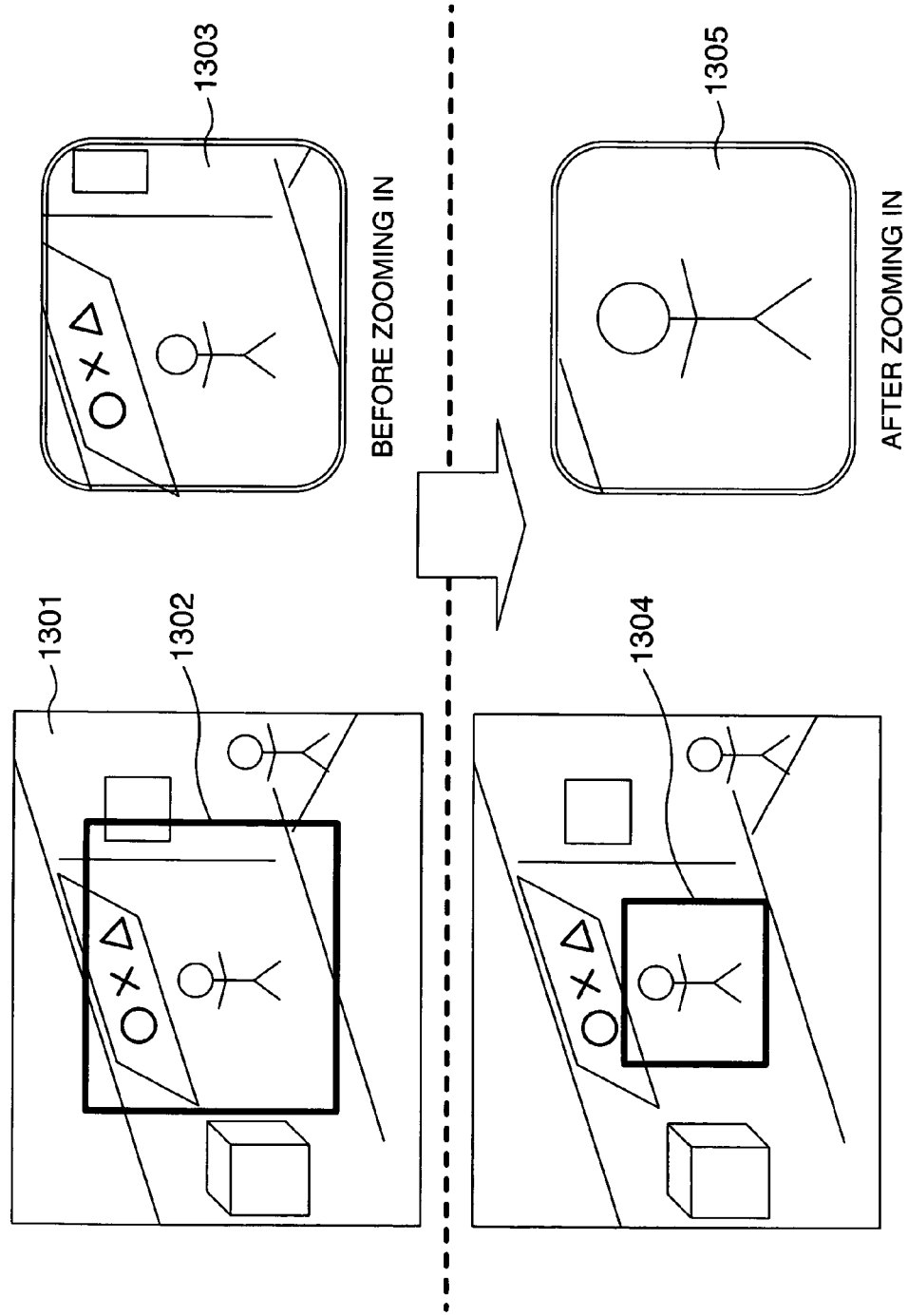

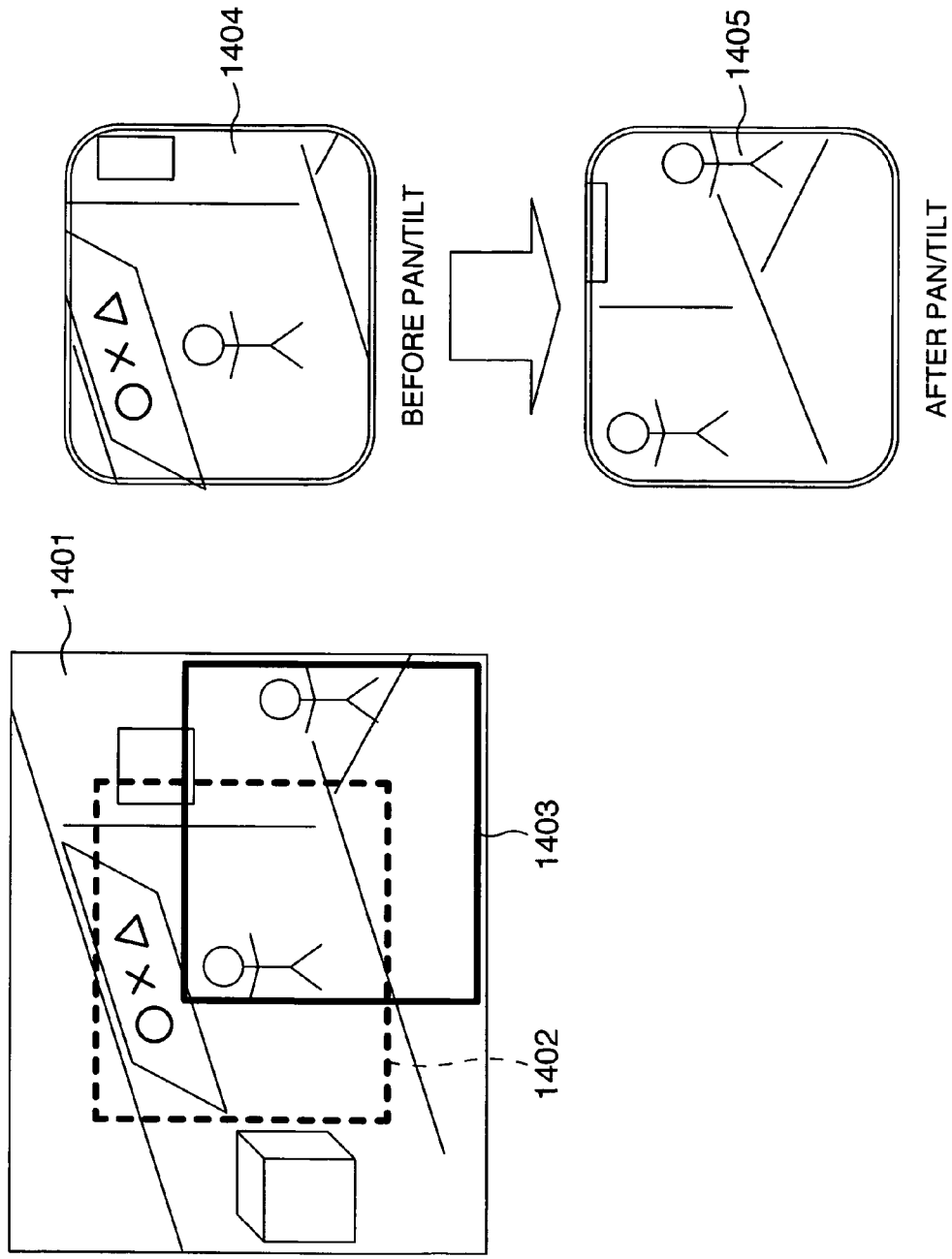

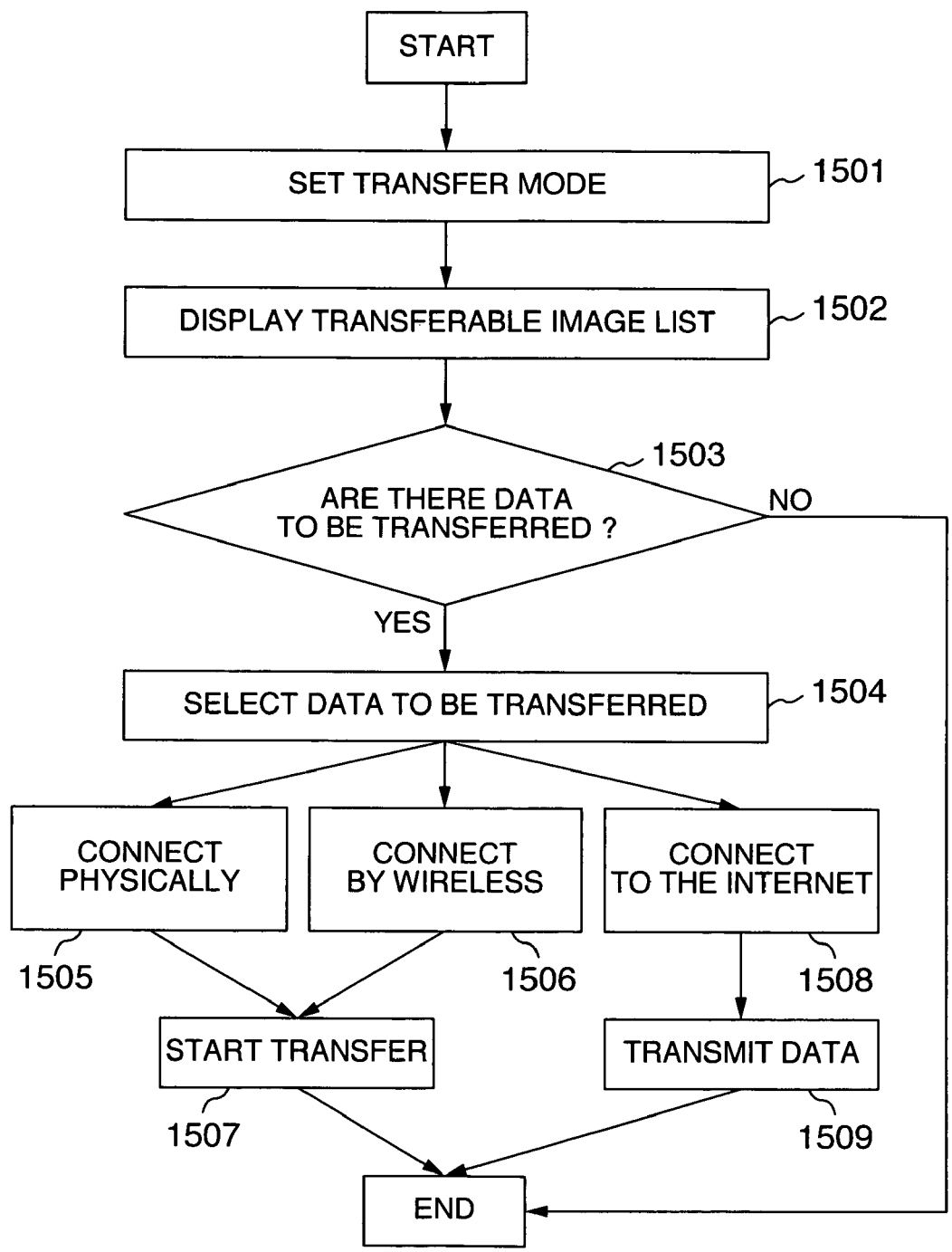

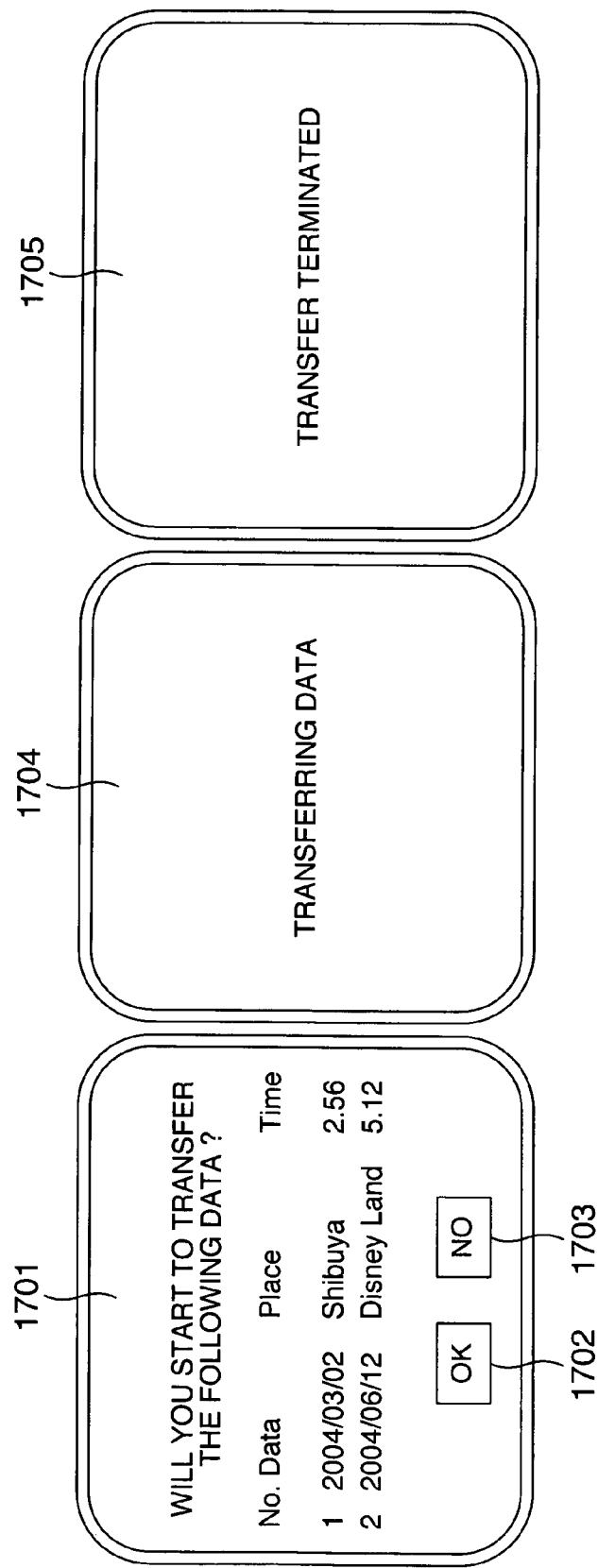

FIG.18

| NAME | ID | STATUS | POSITION INFORMATION | FRIENDS | | |
|---|---|---|---|---|---|---|
| ○○○ | 1001 | ON | 34° 19' | 1003 | 1023 | 1077 |
| △△△ | 1002 | OFF | — | 1001 | 1004 | |
| □□□ | 1003 | ON | 34° 21' | 1001 | 1002 | 1010 |

| Camera ID | POSITION | FIELD ANGLE | DIRECTION | ELEVATION ANGLE |
|---|---|---|---|---|
| 100 | 34° 05' | 60 DEGREES | SOUTHWEST | 30° |
| 101 | 35° 11' | 75 DEGREES | NORTH | 40° |
| 102 | 36° 00' | 100 DEGREES | NORTHEAST | 28° |

1901, 1902, 1903, 1904, 1905

FIG.22
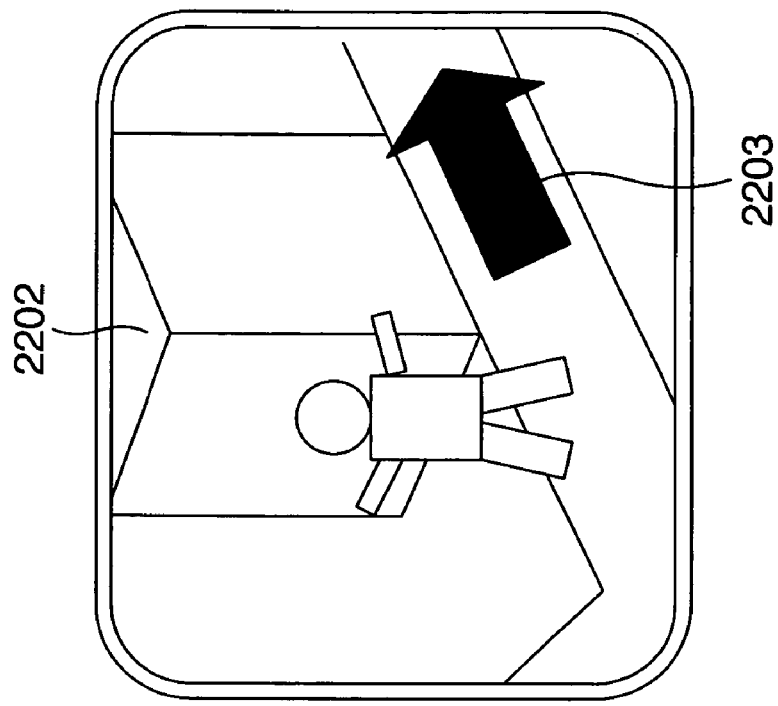
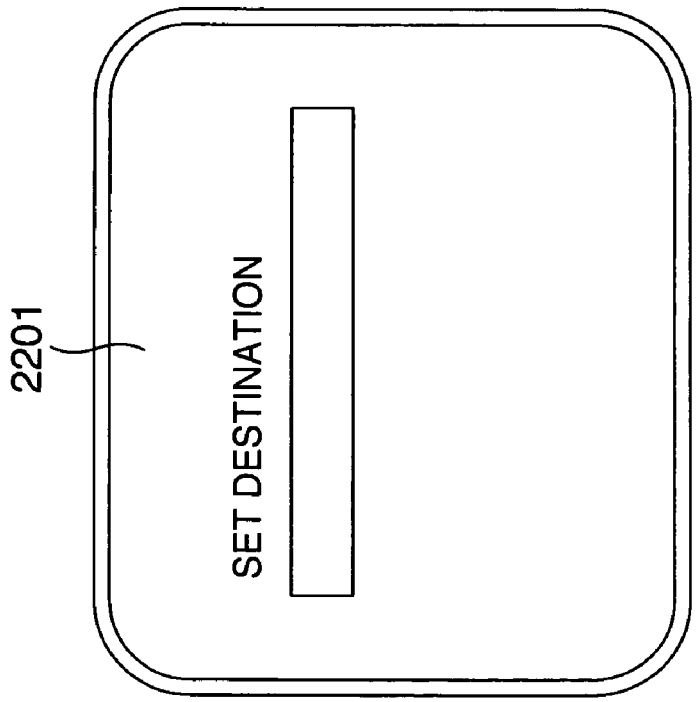

IMAGE PROVIDING SERVICE SYSTEM

INCORPORATION BY REFERENCE

The present application claims priority from Japanese application JP 2004-365260 filed on Dec. 17, 2004, the content of which is hereby incorporated by reference into this application.

BACKGROUND OF THE INVENTION

1. Field of the Invention

The present invention relates to a camera image service system for distributing images of users to terminals of the users in an amusement facility such as a theme park or a closed area such as a station yard or a department store building.

2. Description of the Related Art

In recent years, cameras have been installed throughout in public or quasi-public spaces such as streets, theme parks, station yards, buildings, schools, etc. These cameras are connected to networks so that high-quality image data can be transmitted and received at a high speed due to broader-band communication and higher-performance cameras such as higher-resolution cameras.

On the other hand, in recent years, with the popularization of digital video cameras, anyone has been able to take images with ease, edit the images, record the images in recording media such as DVDs, or copy the images for others.

However, most of images from a plurality of cameras installed in public spaces are used for the principal purpose of security. Only specified persons such as guards can watch the images only at specified places such as monitoring stations, but the public cannot watch the images. In addition, the public cannot easily know for what, by whom and how the taken images are used or where the taken image data are accumulated.

On the other hand, a plurality of cameras are installed for the purpose of security in some quasi-public spaces such as theme parks or department stores. However, users cannot operate these cameras and use them for amusement such as ceremonial photographs. For such amusement, it is general to use cameras brought with the users themselves.

However, in order to take a ceremonial photograph including a user himself or herself with such a digital video camera brought with the user himself or herself, the user has to ask a third person to take the photograph for the user. In addition, there is a limit in the angle with which anyone can take a photograph. An image cannot be taken from a viewpoint where anyone cannot be located, for example, at an angle from the roof of a building.

In some amusement facilities such as theme parks, photographs of visitors riding on vehicles as attractions can be taken automatically and sold to the visitors at terminals or stores placed in the theme parks. However, in such a system, the visitors are not informed when they are photographed. Thus, it is difficult for the visitors to be photographed in the postures desired by the visitors.

SUMMARY OF THE INVENTION

To solve the foregoing problems, an object of the present invention is to provide a system in which a user can operate his/her own client terminal so as to easily and enjoyably gain access to images including the user himself/herself and taken from a plurality of cameras, display the images in real time, record the images and further reproduce the recorded images, without asking a third person to do anything and while confirming the images with his/her own eyes, and the user can also perform camera operation such as camera switching, zooming, tilting, or the like, through the client terminal.

In order to attain the foregoing objects, an image service system according to the invention includes means for acquiring position information of a user, means for acquiring position information, field angle information, direction information, etc. of cameras, means for distributing images including the user himself/herself to a client terminal of the user, means for accumulating/distributing image data, means for displaying camera images, and means for performing image processing upon camera images.

In this case, images from a plurality of cameras installed in a theme park or the like are accumulated in a server. Further, the server also stores frame information, and information about date, camera ID, etc. as to each piece of image data. The camera ID serves to determine which camera photographed the image.

In addition, the server stores user information and camera information. The user information includes names of users using the image service system according to the invention, ID numbers of the users, position information of the users, etc. The camera information includes camera ID numbers for identifying cameras, camera positions, etc.

A client terminal held by each user notifies its current position to the server every predetermined time.

With reference to the user information and the camera information, the image service system according to the invention can automatically detect the position of the user and the positions of cameras surrounding the user, further automatically select an image including the user using information such as field angles, directions, etc. of the cameras, and display the selected image on the client terminal of the user.

In the client terminal, a software image process can be applied to image data distributed from the image server. The user can perform operation such as zooming, pan, tilt or the like upon the image in the client terminal.

In addition, the user can perform operation such as recording or reproducing the image in the client terminal.

Further, according to the invention, in a theme park or the like, a plurality of cameras can be installed in a site where any person cannot be located, for example, on the roof of a building or under water.

With such a configuration, the user can gain free and easy access to images of the user himself/herself among images from a plurality of cameras installed in a theme park or the like. Thus, the user can take a ceremonial photograph without asking a third person to do anything, or take an image at an angle with which any person cannot take.

Other objects, features and advantages of the invention will become apparent from the following description of the embodiments of the invention taken in conjunction with the accompanying drawings.

BRIEF DESCRIPTION OF THE DRAWINGS

FIG. 7 is a flow chart of a real-time image display process according to the invention;

FIG. 10 is a flow chart of a recording process according to the invention;

FIG. 11 is a flow chart of a recorded image reproducing process according to the invention;

FIG. 12 is an explanatory view showing a recorded image list screen according to the invention;

FIG. 13 is an explanatory view showing a zooming process performed on an image according to the invention;

FIG. 14 is an explanatory view showing a pan/tilt process performed on an image according to the invention;

FIG. 15 is a flow chart of an image data transfer process according to the invention;

FIG. 16 is an explanatory view showing a to-be-transferred data list screen according to the invention;

FIG. 17 is an explanatory view showing transition from one screen to another when image data are transferred according to the invention;

FIG. 18 is an explanatory view showing a user information management table of an image administration server according to the invention;

FIG. 19 is an explanatory view showing a camera information management table of the image administration server according to the invention;

FIG. 22 is an explanatory view showing screens in the system for acting as guide using cameras according to the invention.

DESCRIPTION OF THE EMBODIMENTS

An embodiment of the invention will be described below with reference to the drawings.

Figure 1:
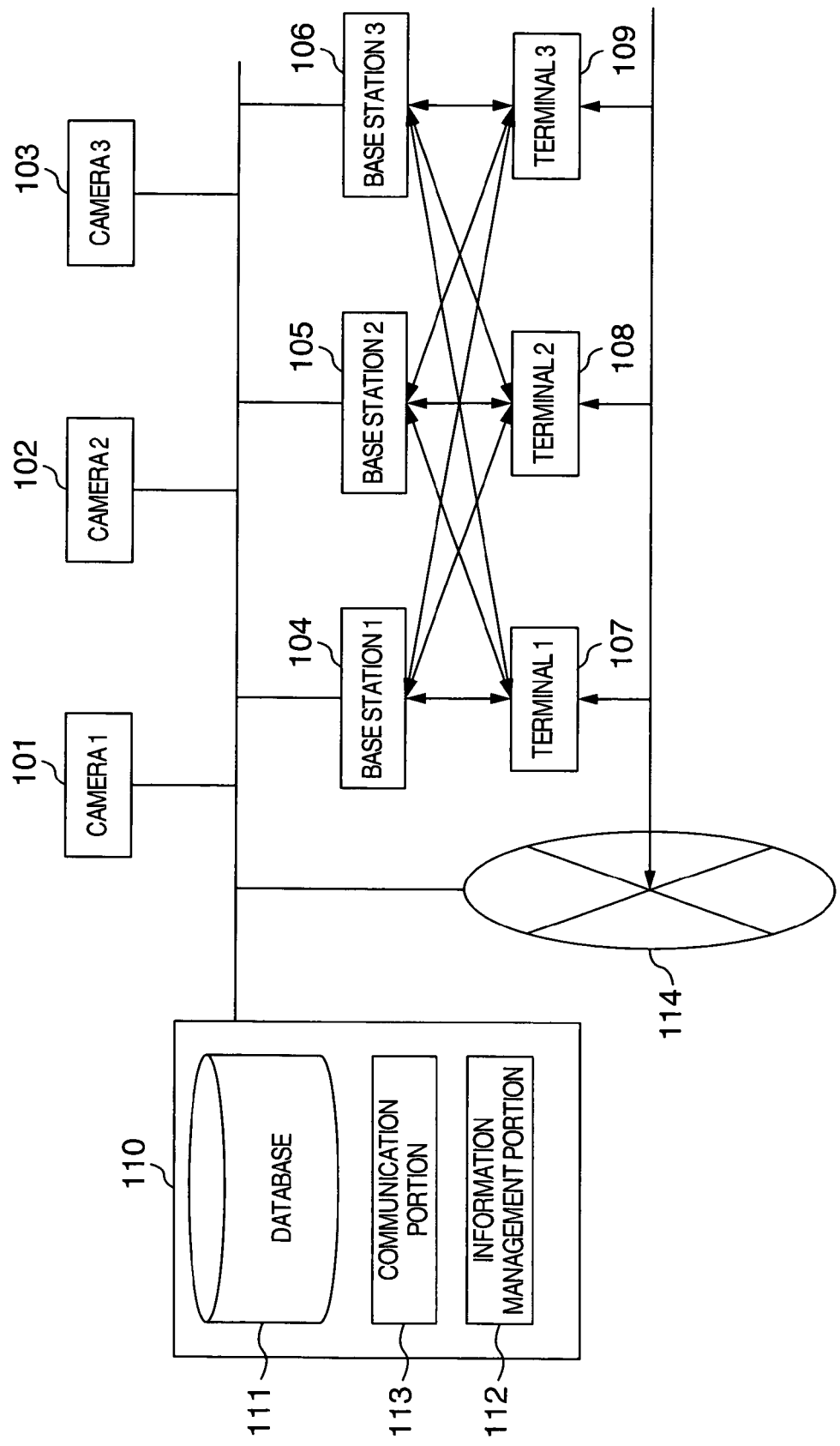
FIG. 1 is an explanatory diagram showing the outline of a system according to the invention.

FIG. 1 is a schematic configuration diagram showing an embodiment of the invention. The reference numerals 101, 102 and 103 represent cameras connected to a network 114; 104, 105 and 106, base stations of sensors, wireless LANs or the like for detecting position information of client terminals; 107, 108 and 109, client terminals; 110, a server for administering images or user information; and 111, a database for accumulating image data.

In FIG. 1, the client terminals 107, 108 and 109 are connected to the image administration server 110 through the network 114. For distribution of images, the image administration server 110 has a storage portion 111 for accumulating image data, an information management portion 112 for managing user information and camera information, and a communication portion 113 for making communication with the outside. The user information means information unique to users, such as names, addresses, terminal IDs, etc. of the users. The camera information means information unique to cameras, ID numbers, installation places, etc. of the cameras.

In addition, in FIG. 1, the base stations 104, 105 and 106 serve to collect information from wireless LANs or infrared sensors for detecting the position information of the client terminals.

Figure 2:
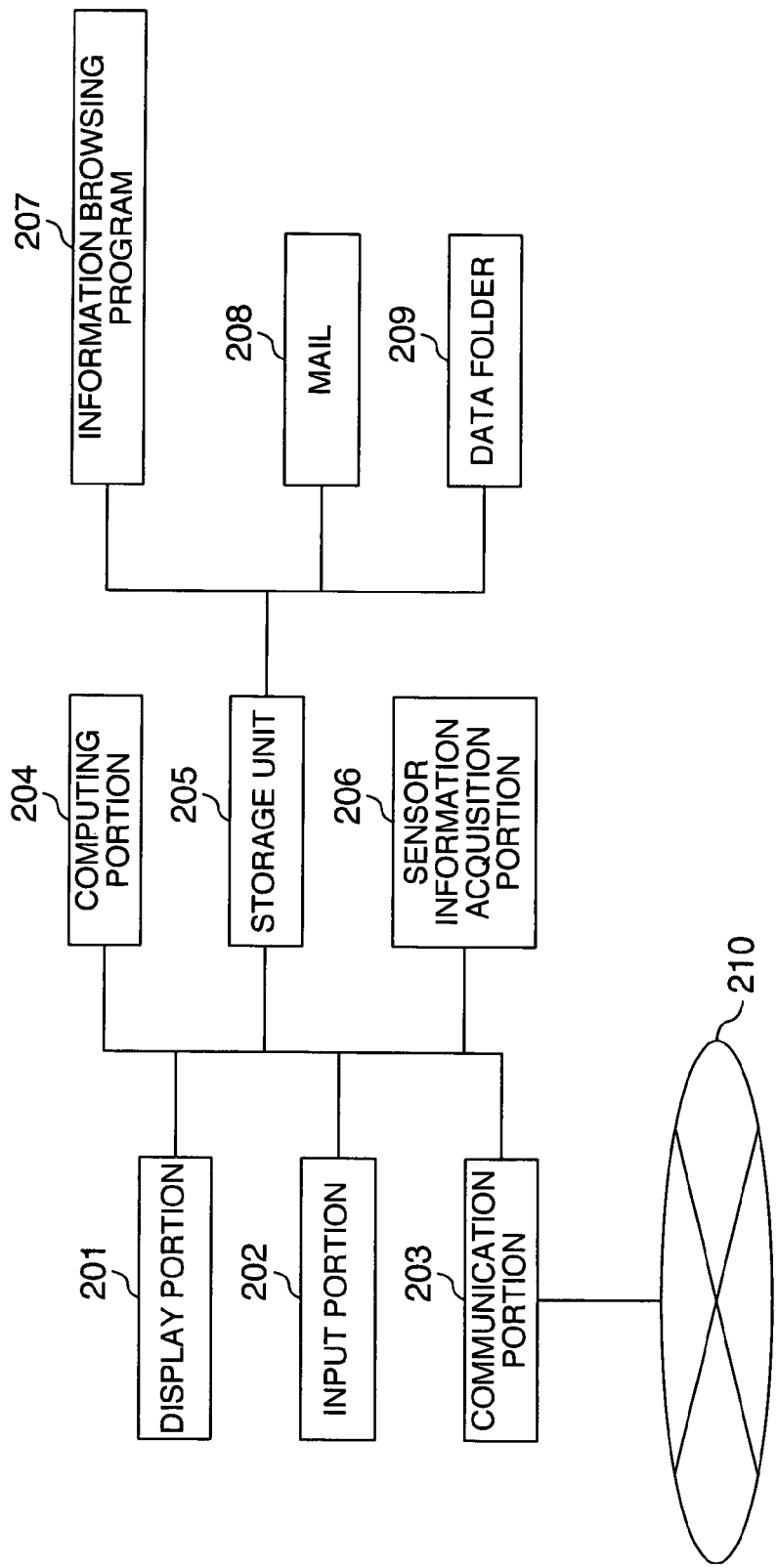
FIG. 2 is an explanatory diagram showing the configuration of a client terminal according to the invention.

FIG. 2 shows a configuration diagram of a client terminal. The client terminal has a display portion 201, an input portion 202, a communication portion 203, a computing portion 204, a storage unit (hard disk) 205, a sensor information acquisition portion 206, an information browsing program 207, a mail function 208 and a data folder 209. The client terminal serves to download images using a network 210 such as the Internet.

The information browsing program 207 is stored in the storage unit 205. When the computing portion 204 starts up the information browsing program 207, mails, data stored in the data folder 209, and data downloaded from the image server can be displayed on the screen.

In the mail function 208, a mail application is started up as soon as an icon linked with the mail function is selected by user's operation in the input portion 202. Thus, a mail can be transmitted to a mail destination selected from a distribution list stored in the data folder 209.

Operating the input portion 202, the user can make communication with the image administration server 110 through the communication portion 203 so as to acquire images, or make communication with another information terminal.

The client terminal may be purchased by the user, or lent in a site such as a theme park where this system is used.

Figure 3:
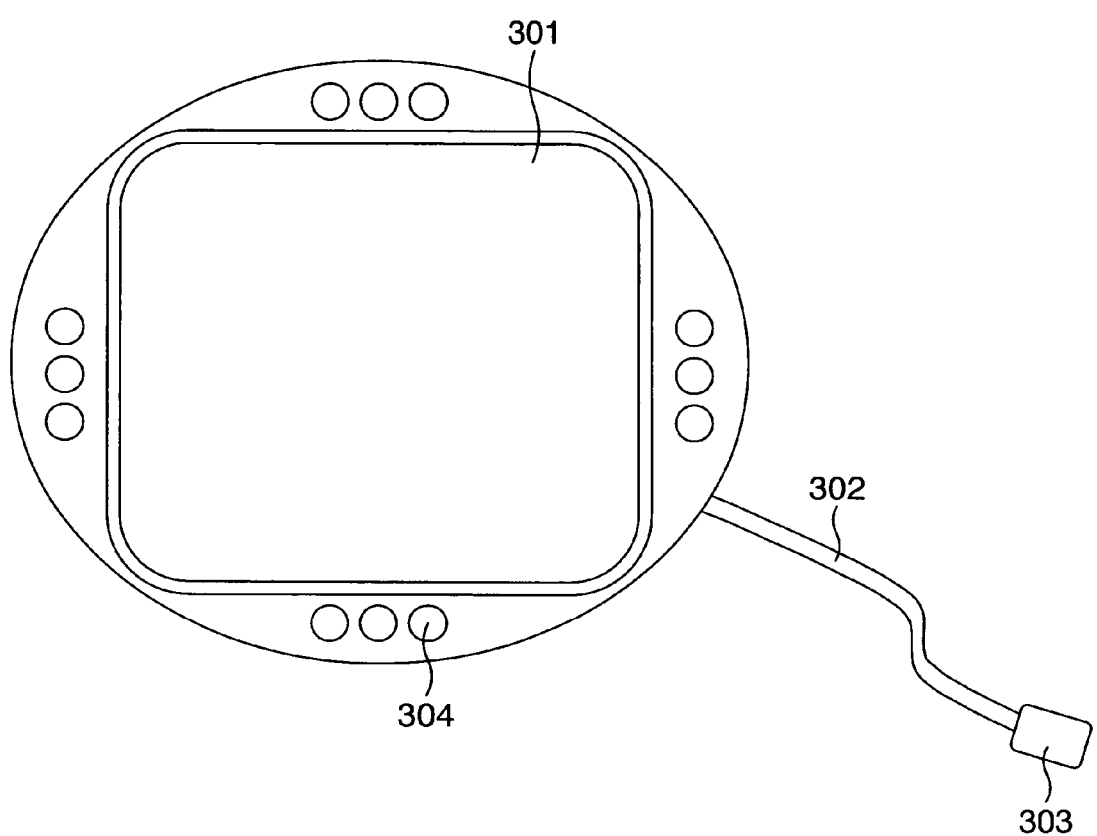
FIG. 3 is an explanatory view showing an example of the client terminal according to the invention.

FIG. 3 shows an example of the client terminal. The reference numeral 301 represents a display; 302, a cable for making connection with another device; 303, a connection portion; and 304, an input portion. A menu for operating the client terminal or an image distributed from the image server is displayed on the display 301. Although the wired cable 302 is shown for connection in FIG. 3, the connection may be secured by wireless. The connection portion may be a physical connector, or may be an infrared transmission/reception portion or the like. The input portion 304 may include buttons, a keyboard or other input means.

Figure 4:
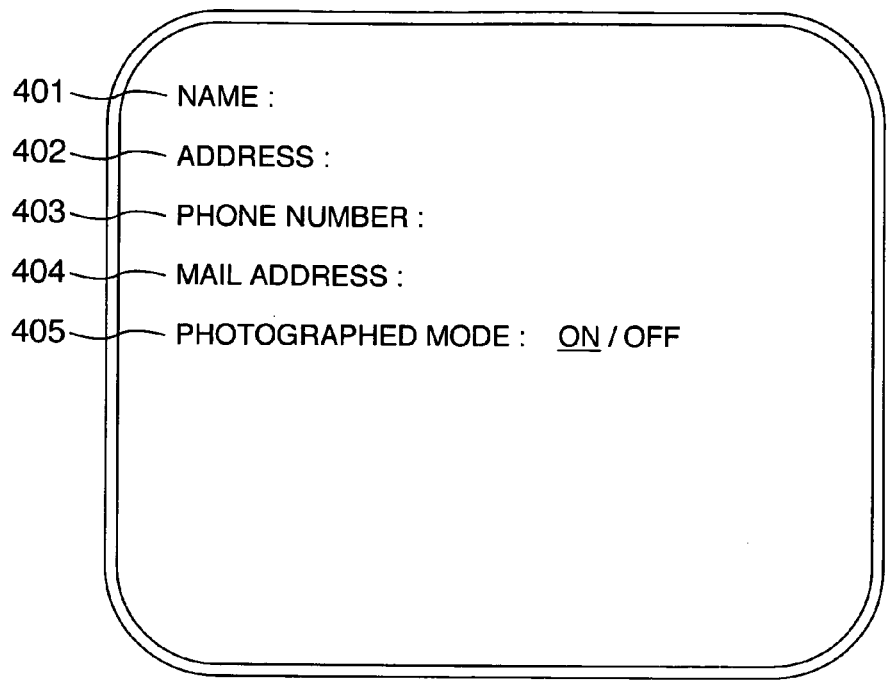
FIG. 4 is an explanatory view showing a user registration screen according to the invention.

FIG. 4 shows an example of a user registration screen. A user using a client terminal for the first time inputs personal information such as a name 401, an address 402, a phone number 403, a mail address 404, etc. to entry fields through the input portion. The user may be allowed to input other information. The user can set a "photographed mode" 405 ON or OFF to thereby determine whether other client terminals of user's friends should be permitted to watch images including the user or not. When the "photographed mode" is ON, images can be taken by the other client terminals from a plurality of cameras photographing the images including the user. When the "photographed mode" is OFF, the images cannot be taken by the other client terminals.

Figure 5:
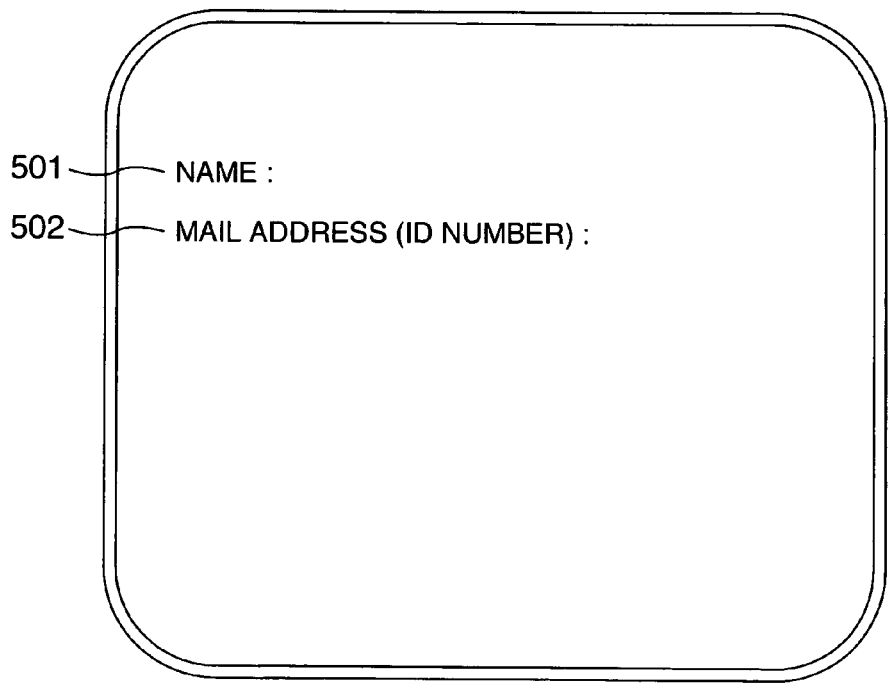
FIG. 5 is an explanatory view showing a friend registration screen according to the invention.

In addition, the user can watch images from cameras surrounding another person whose "photographed mode" is ON. For this, "friend registration" has to be performed in advance. FIG. 5 shows an example of a friend registration screen. The user identifies each friend by a name 501 of the friend and a terminal-unique ID number or mail address 502 designating a client terminal of the friend. The user has to acquire the terminal-unique ID number or mail address directly or indirectly from the friend before the friend registration.

Figure 6:
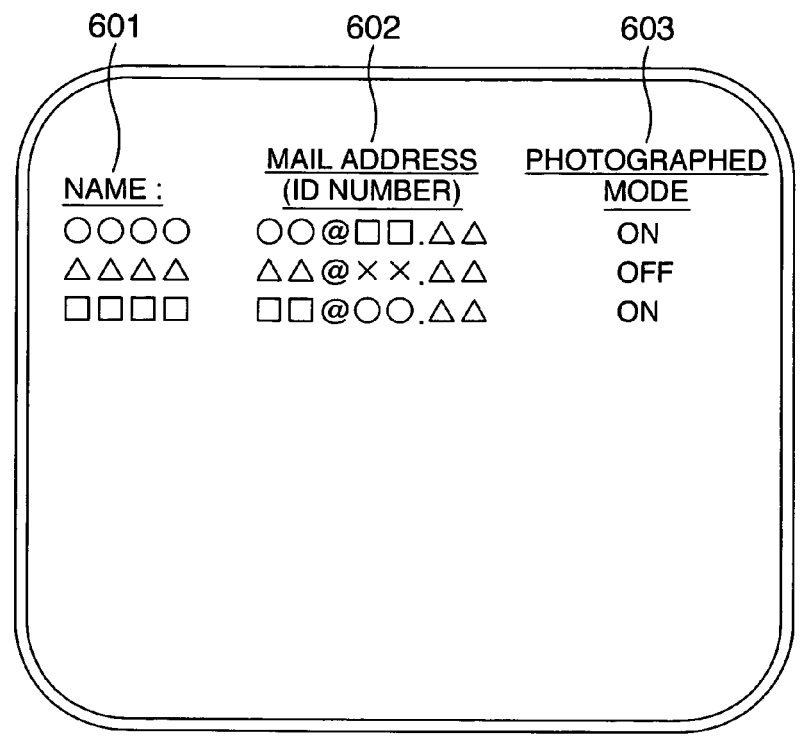
FIG. 6 is an explanatory view showing a friend list screen according to the invention.

FIG. 6 shows an example of a list of registered friends. Each entry of the list is constituted by a name 601, a mail address 602 and a photographed mode 603. The mail address is unique to a client terminal, and it serves to identify the client terminal. The mail address may be replaced by an ID number unique to the client terminal. When the photographed mode is ON, the user can watch images including the friend on the client terminal of the user. When the photographed mode is OFF, the user cannot watch images from cameras surrounding the friend. The photographed mode can be changed at any time by the user. For example, the photographed mode can be changed over desirably so that the photographed mode is OFF in a private site while it is ON in any other site.

Figure 8:
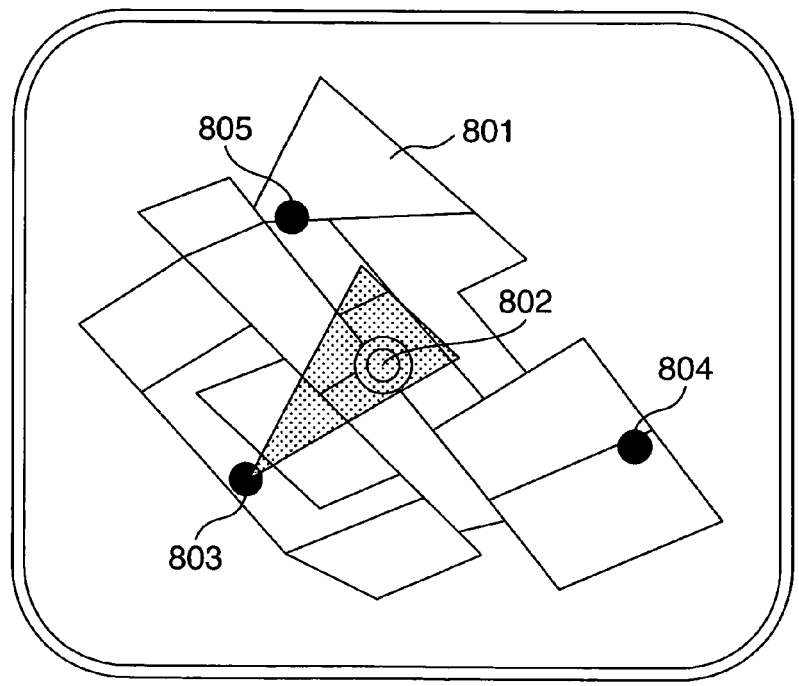
FIG. 8 is an explanatory view showing an example of a screen indicating positions of a user and cameras according to the invention.

FIG. 7 shows an example of a flow of a real-time image display process. First, the current position of a client terminal is acquired in Step 701. A method using a wireless LAN, a method using a GPS, a method using a sensor net with a plurality of infrared sensors, and so on, can be considered for acquiring the current position. However, other methods may be used. Next, the client terminal notifies the administration server of the acquired current position in Step 702. A communication protocol such as HTTP is used as a communication method of the notification. The acquisition of the current position and the notification to the administration server are performed every predetermined period, for example, every five minutes. Thus, the administration server can always grasp the latest current position. Alternatively, the administration server may be notified of the current position of the client terminal measured in response to a request from the user. When the server acquires the current position of the user, the server acquires the positions of the cameras with reference to the camera information management table in Step 703, and selects cameras installed within a predetermined distance from the user's position. Further, from the cameras, the server selects only cameras imaging the user with reference to information such as directions, field angles, etc. of the cameras in Step 704. When there are cameras imaging the user, a map as shown in FIG. 8 is displayed on the client terminal in Step 705, so as to inform the user of the position of the user and the positions of the cameras. In this event, the client terminal may be vibrated or a sound may be generated from the client terminal, so as to notify the user of the fact that there are cameras photographing images including the user. The user selects one camera from the plurality of cameras through the input means such as buttons in Step 706, and an image from the selected camera is displayed on the display portion in Step 707.

FIG. 8 shows an example of a displayed screen on which a map 801 is used so that a position 802 of the user and positions 803, 804 and 805 of cameras surrounding the user are displayed on the display of the client terminal to notify the user of those positions. The user may be notified of the camera positions in any other method. In addition, the field angle of a camera may be illustrated as shown in the position 803.

Figure 9:
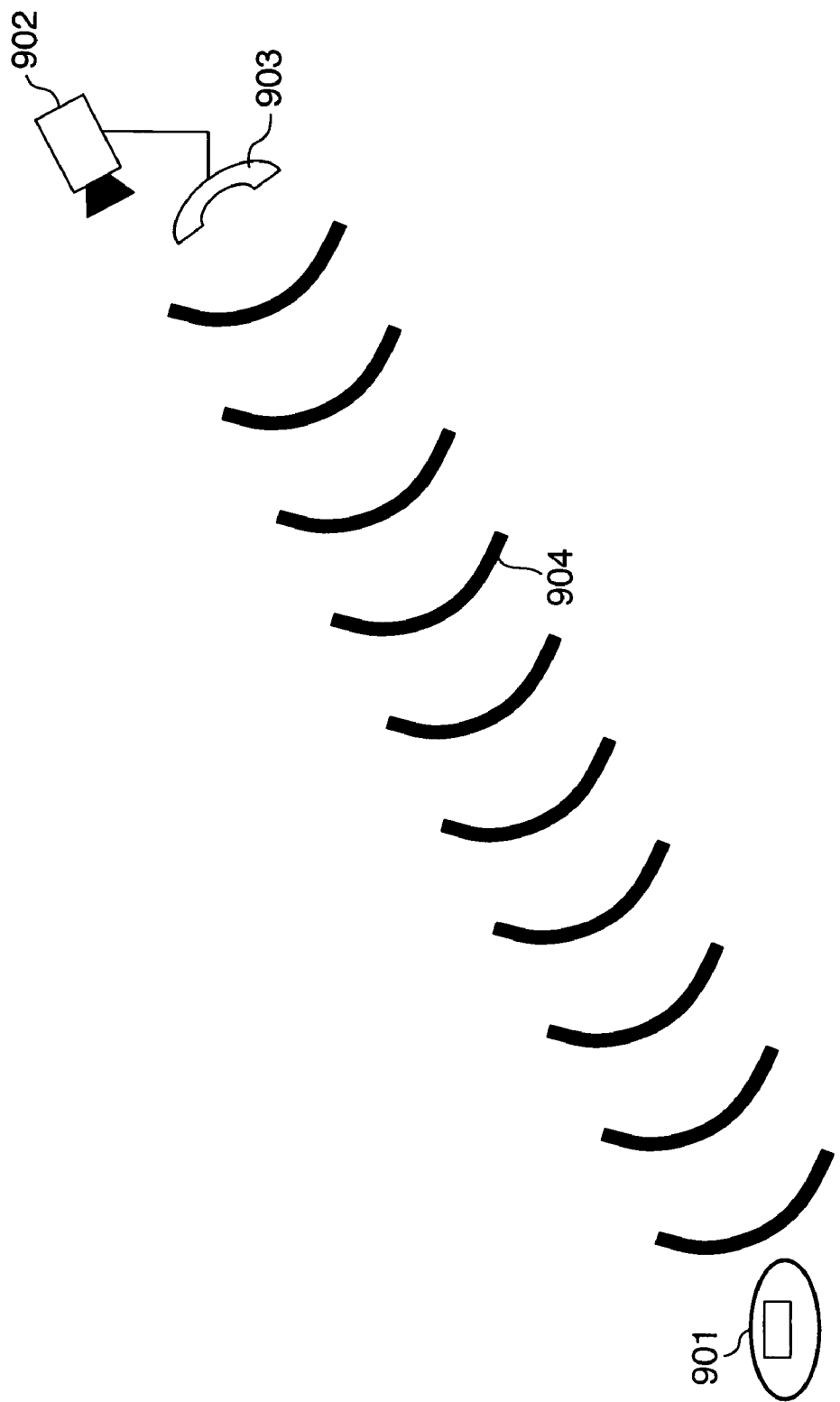
FIG. 9 is an explanatory view showing an example of detection of a user's position according to the invention.

Any other method than the aforementioned method for selecting cameras with reference to the position information of the user and the position information of the cameras may be used as the means for selecting cameras which are photographing (can photograph) images including the user. For example, as shown in an example shown in FIG. 9, there is another method in which a radio wave 904 is radiated using a directional antenna 903 or the like in tune with the field angle of a camera 902, and the position of the camera is displayed as soon as a client terminal 901 carried with the user receives the radio wave.

FIG. 10 shows a flow chart in which the client terminal acquires an image from a camera through the server and records the image. A real time image is displayed in Step 1001. In this state, assume that an image to be recorded is displayed in Step 1002. In this case, when a record button is pushed down in the input portion 202 in Step 1003, recording is started. In this event, a record flag, position information, date information, etc. are transmitted to the administration server in Step 1004. The record flag is a digit by which the image server can identify a record start frame. For example, the record flag is set as 1 when recording is started, as 2 when recording is stopped, as 0 when recording is not performed. Thus, it can be determined whether recording is being performed or not. When a record stop button is pushed down in Step 1005, the record flag, the position information, the date information, etc. are transmitted to the server in Step 1006. These pieces of information will be used when the recorded image is reproduced or edited, as will be described later.

FIG. 11 shows a flow chart in which a recorded image is reproduced in the client terminal. The client terminal is normally in a mode for displaying a real time image. This mode is changed into a playback mode in Step 1101. In the playback mode, a list of recorded images as shown in FIG. 12 is displayed in Step 1102. The list shows information such as numbers, dates, places, recording times, etc. When there are recorded images in Step 1103, the user moves the cursor up/down so as to select an image to be reproduced in accordance with a desired date and a desired place in Step 1104. Thus, the selected image is reproduced in Step 1105.

FIG. 12 shows an example of a list of recorded images. A number 1201, a date 1202, a place 1203, a recording time 1204, etc. are displayed in each entry of the list. The user can move a cursor 1205 up/down so as to select an image to be reproduced. When the list is long, the user can operate a scroll bar 1206 so as to view the whole list.

A graphical display method for displaying thumbnail images of the recorded images instead of the recorded image list chiefly composed of characters as shown in FIG. 12 may be used.

The images can be also edited. For example, a plurality of listed images selected from the recorded image list as shown in FIG. 12 may be combined with one another, or a selected image may be compacted.

FIG. 13 shows a method for zooming in on an image. The client terminal receives high-resolution image data 1301 from the administration server. A part of a picture photographed by a camera is cut and displayed on the display portion of the client terminal. In the computing portion 204 of the client terminal, a region 1302, 1304 which is the part of the picture are scaled up or down by image processing to thereby zoom in or out on the image in a screen 1303, 1305.

FIG. 14 shows a method for performing a pan/tilt process on an image. The client terminal receives high-resolution image data 1401 from the administration server. A display area is shifted to display a partial region 1402, 1403 of a camera image. Thus, pan/tilt is attained in a screen 1404, 1405.

FIG. 15 shows a flow chart in which image data are transmitted from one client terminal to another client terminal or another device such as a PC or a portable telephone. The data transfer may be attained by transferring the image data directly. However, when the data size of the image data is large, it may take much time to transfer the data. According to the invention, therefore, only the date information or the image frame information of an image to be transferred is exchanged. As for the actual image data, the client terminal makes a request to the server for an image corresponding to the date information or the image frame information.

With reference to FIG. 15, description will be made about a method for transferring image data to another client terminal or another device such as a PC or a portable telephone. First, when data are transferred to another client terminal, means including wireless connection such as a wireless LAN or an IR connector, wired connection such as an Ethernet cable, or the like, can be considered. When the client terminal is brought into a "data exchange mode" in Step 1501, a list of data-exchangeable image data as shown in FIG. 16 is displayed in Step 1502. Alternatively, thumbnail images of data-exchangeable images may be displayed instead of the list. Here, the data-exchangeable image data means a recorded image or an edited image. When there are image data to be exchanged in Step 1503, the user selects data to be exchanged by a method for checking off the list in Step 1504. When the selection of data to be exchanged is terminated, the client terminals are connected with each other by cable in Step 1505 or by wireless in Step 1506. When the connection is established, the selected image data are exchanged between the client terminals in Step 1507. The data exchange may be started automatically after the connection is established or as soon as a button such as a "data exchange start" button is pushed down. When data are transferred to another device such as a PC or a portable telephone, the client terminal is connected to the Internet in Step 1508, and transfers the image data using a mail or a communication protocol such as HTTP.

FIG. 16 shows an example of the data exchange list. A list of exchangeable recorded or edited image data is displayed in the same manner as the recorded image list. Image data with a check 1602 in a check box 1601 are intended to be transferred. The images are selected by moving a cursor 1603 up/down. When the list cannot be displayed on one screen, the list is scrolled and displayed by use of a scroll bar 1604. As for a method for displaying the list, the list may be chiefly composed of characters or may be displayed by thumbnail images.

FIG. 17 shows an example of transition from one screen to another when data are transferred. When the selection of data to be transferred is terminated, the image data to be transferred are confirmed on a confirmation screen 1701 again. An OK button 1702 is pushed down when there is no error, and a NO button 1703 is pushed down when there is an error or when selection is to be performed again. During data transfer, a message 1704 such as "transferring data" is displayed on a menu screen. When the data transfer is terminated, a message 1705 such as "data transfer terminated" is displayed. Thus, the user is notified of the condition of the data transfer.

As shown in FIG. 1, the image administration server 110 is constituted by the storage portion 111 for storing image data and the information management portion 112 for managing user information and camera information.

FIG. 18 shows an example of a user information management table of the information management portion 112 of the server. Each entry of the user information management table records a name 1801 of a user registered in a client terminal of the user, an ID number 1802 of the user, a status 1803 indicating whether the power of the client terminal is ON or OFF, position information 1804 of the user, ID numbers 1805 of registered friends, etc. In addition thereto, information such as an address, a phone number and a mail address may be recorded. The position information of the user is rewritten and recorded whenever the position information is updated.

FIG. 19 shows an example of a camera information management table. Each entry of the camera information management table records information which can be used for specifying the photographable range of each camera, such as a camera ID number 1901, a camera installation place 1902, a field angle 1903, a direction 1904, an elevation angle 1905, etc. Other information may be recorded.

In the image service system according to the invention, a camera imaging the user is determined from the information such as the user position, the camera position, the field angle, the direction, the elevation angle, etc. so as to display an image including the user on the user's client terminal.

Figure 20:
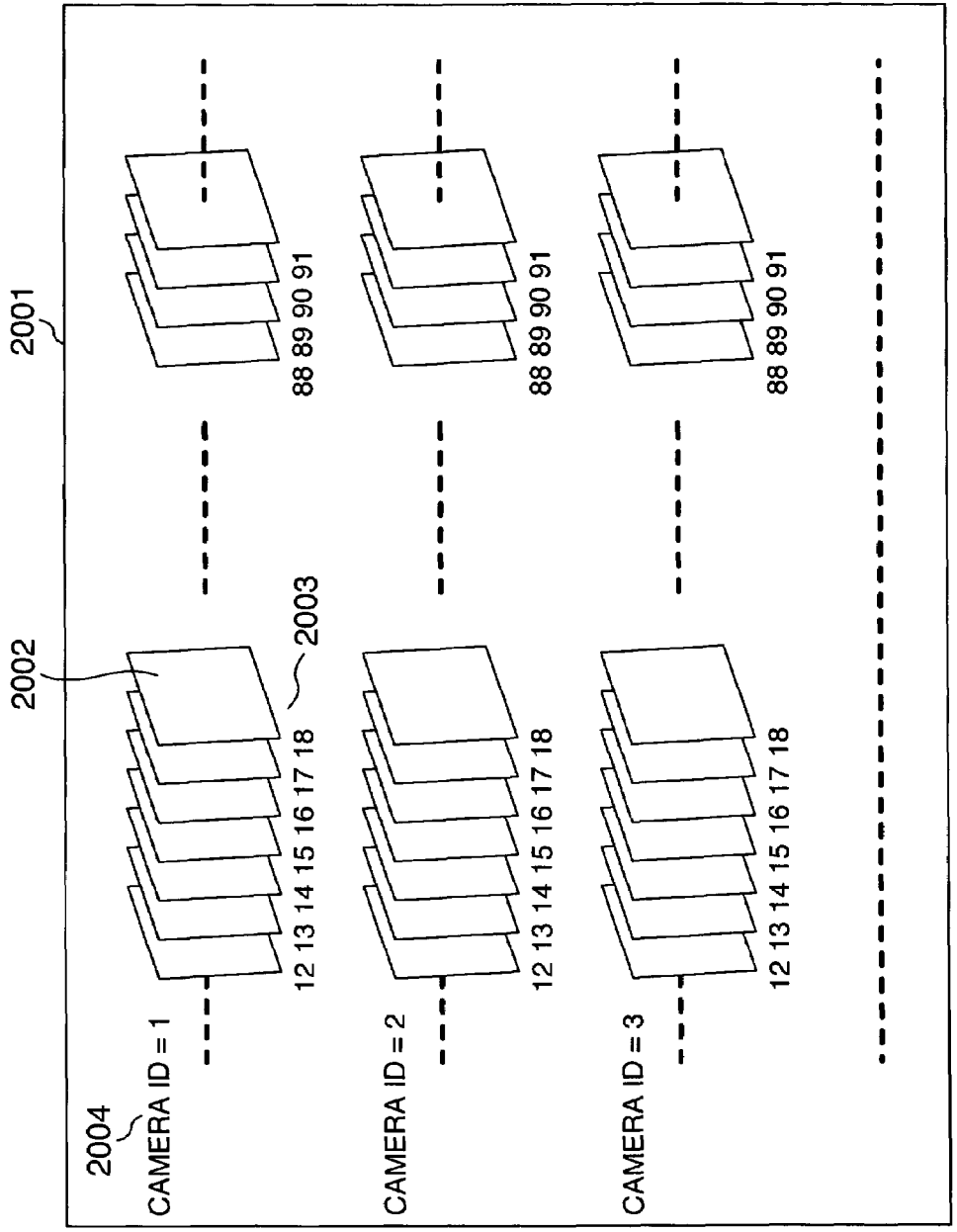
FIG. 20 is an explanatory view showing the outline of records of image data in the image administration server according to the invention.

FIG. 20 explains the storage portion of the image administration server. In a storage portion 2001, images from a plurality of cameras administered by the image service system according to the invention are always accumulated as frames 2002. Each frame also records date information which is not shown in FIG. 20, image frame information 2003 and camera ID information 2004. When a recorded image is reproduced or when data are transferred, an image requested by the user is displayed on the client terminal with reference to the date information or the image frame information.

For the sake of privacy protection, in the image service system according to the invention, cameras are installed so that only images including the user and located within a predetermined distance from the client terminal can be acquired. For example, it is possible to construct a system which cannot be used for peeping into houses of others.

In addition, when there has been no input operation in the terminal for a predetermined time, the power of the terminal is turned off automatically. This is, for example, to prevent the way of use in which the client terminal with power ON is left alone in one site in order to take an image.

Next, description will be made about examples of applications of the image service system according to the invention.

The first application example is a guide service using the image service system according to the invention. In the background art, there is a car navigation system using a GPS or a position information service of a portable telephone. However, most of such systems show a route on a map, in which buildings are drawn by use of computer graphics or the like, but they are different from actual pictures. Thus, their actual appearances may be hardly grasped. In addition, when data of the map information become old over time, new data have to be downloaded by use of the Internet or a CD.

When the image service according to the invention is used for displaying an actual image and showing a route, the aforementioned problems can be solved.

The aforementioned guide service will be described specifically.

Figure 21:
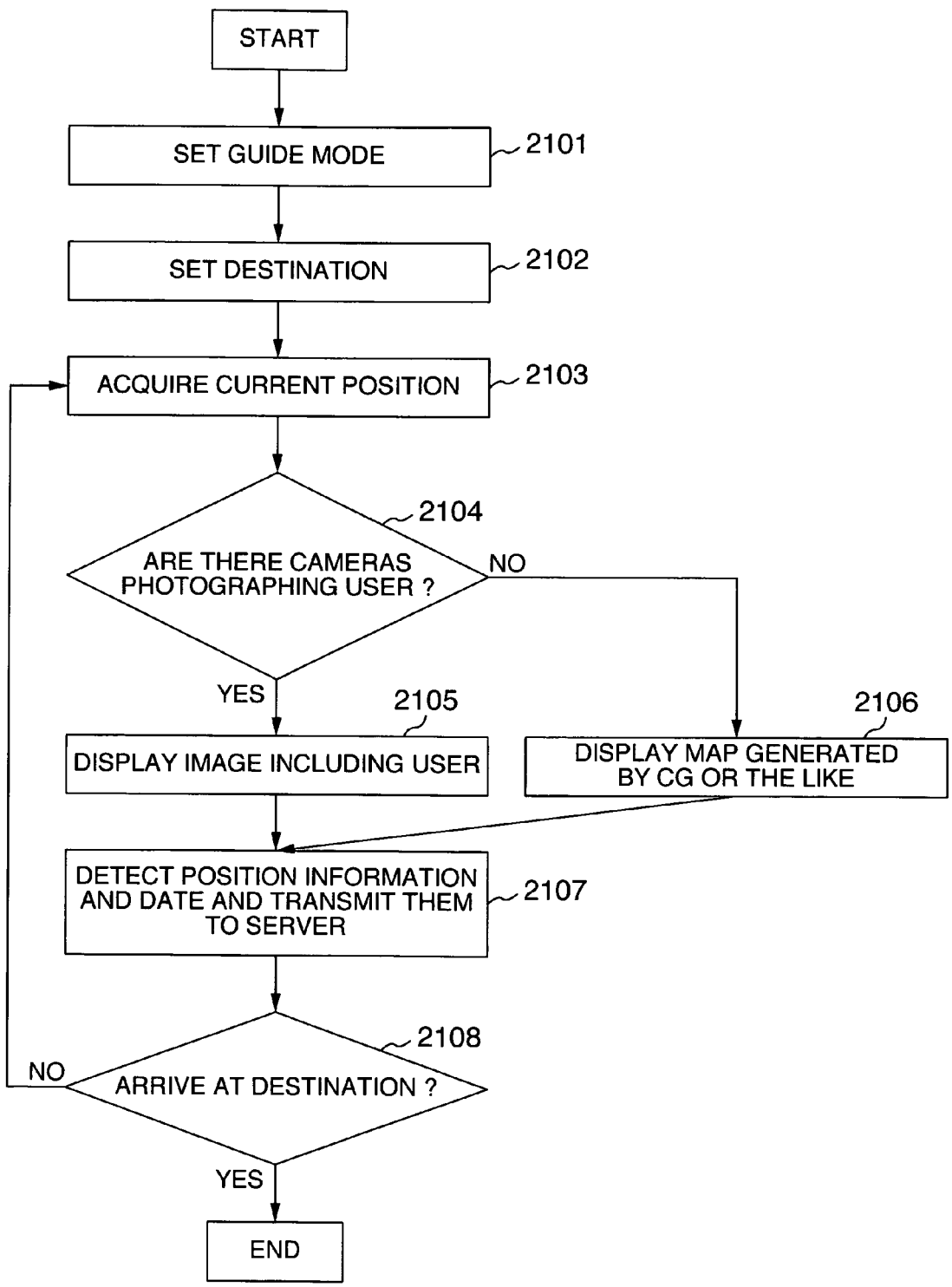
FIG. 21 is a flow chart of a system for acting as guide using cameras according to the invention.

FIG. 21 shows an example of a flow in which the guide service is used. First, when "guide service" is selected from a menu in Step 2101, a destination setting screen 2201 as shown in FIG. 22 is displayed. On this screen, the user sets a destination in Step 2102. When the setting of the destination is terminated, the system detects the current position of the user in Step 2103. When there is a camera surrounding the user and imaging the user in Step 2104, an image 2202 (see FIG. 22) from the camera is displayed on the client terminal in Step 2105. In this camera image, an arrow 2203 (see FIG. 22) indicating the direction in which the user should go is also drawn. The user walks in the arrow direction. When the user is walking, the current position of the user is always detected in Step 2107, and the camera is switched to another camera so that an image from the camera surrounding the user is displayed on the client terminal. When there is no camera surrounding the user and imaging the user, a three-dimensional map using computer graphics is displayed in Step 2106, and the traveling direction is displayed by an arrow. When the user enters the site where there is a camera imaging the user, the image is switched to an actual image.

An actual image displayed to guide the user may be likened to the latest road condition reported to the user. Thus, the guide can be made easy for the user to understand.

Next, another application example will be described.

In the image service system according to the invention, not only is an image including the user himself/herself displayed on the client terminal, but an image including his/her friend registered by the user can be also displayed if the friend sets the photographed mode ON. Therefore, the image service system can be used as a lost child prevention system in an amusement park.

Figure 23:
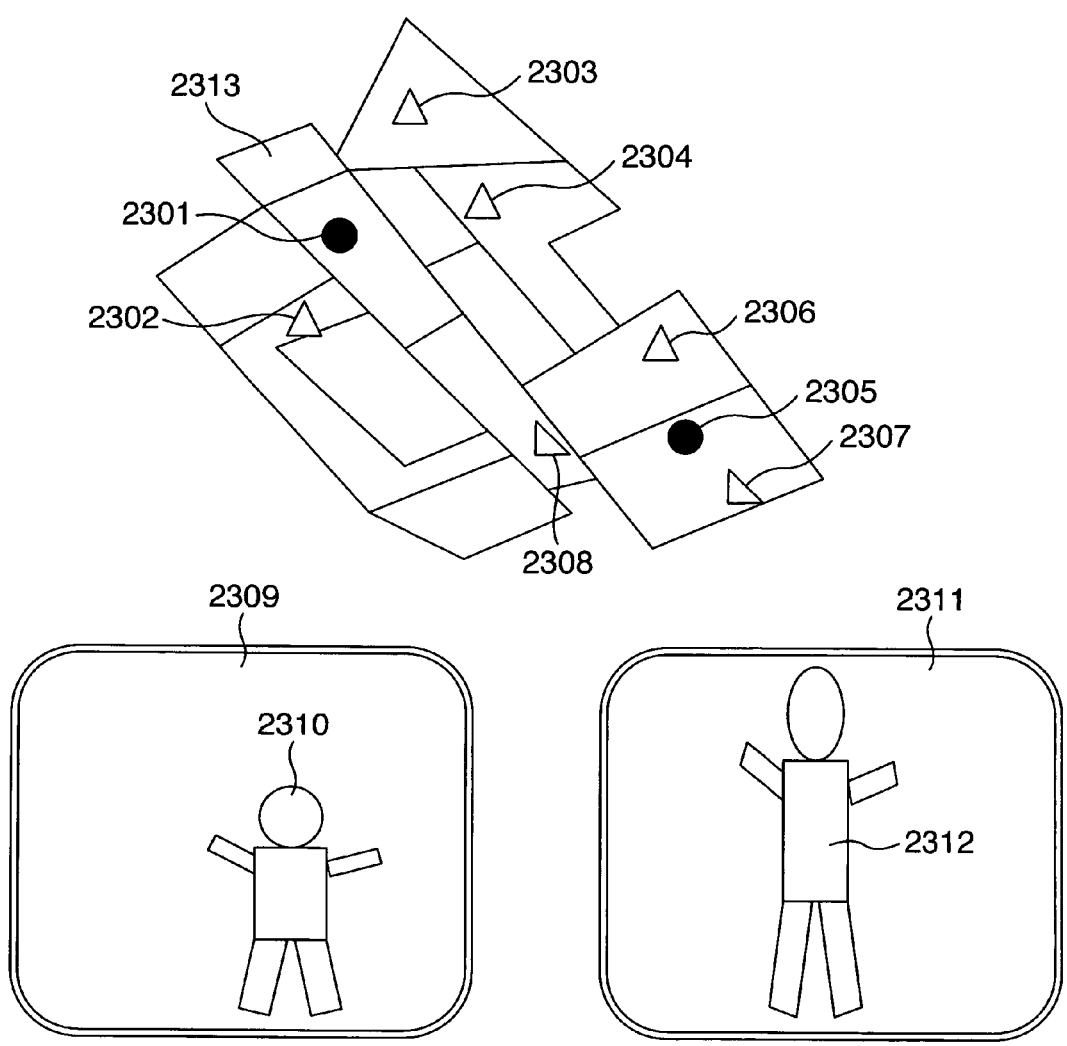
FIG. 23 is an explanatory view showing the outline of a lost child prevention system according to the invention.

FIG. 23 shows an example of a lost child prevention system in an amusement park. In the entrance of the amusement park, client terminals are lent to visitors. In this event, a parent registers his/her child as a friend, while the child registers the parent as a friend. In this case, the photographed mode is set ON. If the child is lost, the child can display images from cameras 2302, 2303 and 2304 surrounding the parent 2301 on a client terminal 2309 of the child so as to confirm a figure 2310 of the parent. On the contrary, the parent can display images from cameras 2306, 2307 and 2308 surrounding the child 2305 on a client terminal 2311 of the parent so as to confirm a figure 2312 of the child.

By use of such a system, the parent can display an image including the child on his/her own client terminal and change the screen by operation such as camera switching, zooming, pan, tilt, etc. Thus, the parent can grasp the surrounding circumstances and identify the place where the child is. On the other hand, the child can display an image including the parent on his/her own client terminal so as to confirm the figure of the parent and have the sense of security.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image service system comprising:
    a plurality of cameras connected to a network; and
    an administration server connected to said plurality of cameras and a client terminal capable of displaying images taken by said cameras, said administration server accumulating said images taken up by said cameras and/or distributing said images to said client terminal;
    wherein said administration server acquires position information of a user holding said client terminal based on communication with said client terminal, detects said cameras within a predetermined distance from said user based on said position information, selects a camera taking images including said user, and provides said images including said user from the selected camera to said client terminal.

2. An image service system according to claim 1, wherein:
    said client terminal is a terminal device connected to said administration server through said network and including a communication portion for making communication with said network, a display portion for displaying images and menus, an input portion for accepting an input from said user, a computing portion for performing control and computing upon said communication portion and said display portion;
    said display portion displays a menu selection screen including icons and a cursor, and images from said cameras; and
    said computing portion activates a function associated with an icon selected from said icons or reads image data associated likewise when a selection input for selecting said icon is accepted in said input portion with said cursor being focused on said icon.

3. An image service system according to claim 2, wherein said client terminal applies a software process to an image acquired from said administration server through said communication portion so as to perform operation such as zooming or scrolling on said image.

4. An image service system according to claim 1, wherein said client terminal includes means for detecting position information and notifying said administration server of said position information.

5. An image service system according to claim 1, wherein said client terminal includes a communication module for making communication with another terminal through said network so that said client terminal can transfer administration data to another client terminal or another device.

6. An image service system according to claim 5, wherein said client terminal and said another terminal can be set in a mode in which images surrounding said client terminal and said another terminal can be provided to each other using positions of said client terminal and said another terminal grasped by said administration server.

7. An image service system according to claim 1, wherein said administration server includes a storage portion for always accumulating images from said plurality of cameras.

8. An image service system according to claim 1, wherein said administration server includes a data management table for managing user information and camera information.

9. An image service system according to claim 1, wherein said administration server includes a storage portion for recording camera IDs, date information and image frame information of recorded image data.

10. An image service system according to claim 1, wherein said cameras are connected to said network so as to continuously transfer image data to said administration server.

11. An image service system according to claim 1, wherein said administration server holds camera information for specifying photographing ranges of said plurality of cameras, and selects a camera taking images including said user based on said camera information.

12. An image service system comprising:
    a plurality of cameras connected to a network; and
    an administration server connected to said plurality of cameras and a client terminal capable of displaying images taken by said cameras, said administration server accumulating said images taken up by said cameras and/or distributing said images to said client terminal;
    wherein said administration server acquires real-time position information of a user holding said client terminal based on communication with said client terminal, detects said cameras within a predetermined distance from said user based on said position information, selects a camera taking real-time images including said user, and provides said real-time images including said user from the selected camera to said client terminal.

13. An image service system according to claim 12, wherein:
    said client terminal is a terminal device connected to said administration server through said network and including a communication portion for making communication with said network, a display portion for displaying images and menus, an input portion for accepting an input from said user, a computing portion for performing control and computing upon said communication portion and said display portion;
    said display portion displays a menu selection screen including icons and a cursor, and images from said cameras; and
    said computing portion activates a function associated with an icon selected from said icons or reads image data associated likewise when a selection input for selecting said icon is accepted in said input portion with said cursor being focused on said icon.

14. An image service system according to claim 13, wherein said client terminal applies a software process to said real-time image acquired from said administration server through said communication portion so as to perform operation such as zooming or scrolling on said real-time image.

15. An image service system according to claim 12, wherein said client terminal includes means for detecting position information and notifying said administration server of said position information.

16. An image service system according to claim 12, wherein said client terminal includes a communication module for making communication with another terminal through said network so that said client terminal can transfer administration data to another client terminal or another device.

17. An image service system according to claim 16, wherein said client terminal and said another terminal can be set in a mode in which said real-time images surrounding said client terminal and said another terminal can be provided to each other using positions of said client terminal and said another terminal grasped by said administration server.

18. An image service system according to claim 12, wherein said administration server includes a storage portion for always accumulating images from said plurality of cameras.

19. An image service system according to claim 12, wherein said administration server includes a data management table for managing user information and camera information.

20. An image service system according to claim 12, wherein said administration server includes a storage portion for recording camera IDs, date information and image frame information of recorded image data.

21. An image service system according to claim 12, wherein said cameras are connected to said network so as to continuously transfer image data to said administration server.

22. An image service system according to claim 12, wherein said administration server holds camera information for specifying photographing ranges of said plurality of cameras, and selects a camera taking images including said user based on said camera information.

* * * * *